United States Patent [19]

Hyll

[11] Patent Number: 5,209,595
[45] Date of Patent: May 11, 1993

[54] DRIVE SHAFT, DRIVE ASSEMBLY AND RELATED METHOD

[75] Inventor: John Hyll, Sandy, Utah

[73] Assignee: Baker Hughes Incorporated, Houston, Tex.

[21] Appl. No.: 877,416

[22] Filed: May 1, 1992

[51] Int. Cl.⁵ .............................................. B25G 3/00
[52] U.S. Cl. ...................................... 403/13; 403/343
[58] Field of Search .................................. 403/13, 343

[56] References Cited

U.S. PATENT DOCUMENTS

| | | | |
|---|---|---|---|
| 3,293,993 | 12/1966 | Lanman | 403/343 X |
| 3,495,123 | 2/1970 | Raddatz | 403/343 X |
| 3,914,067 | 10/1975 | Leto | 403/343 X |

Primary Examiner—Andrew V. Kundrat
Attorney, Agent, or Firm—R. Neil Sudol; Henry D. Coleman

[57] ABSTRACT

A drive shaft has a driving end and a driven end and is provided at the driving end with an external helical thread and a cylindrical pilot surface disposed between the thread and the driving end, the pilot surface having a diameter approximately equal to the inner diameter of the thread. During a mounting of an impeller to the drive shaft, a crest flat of an internal helical thread in the impeller rides on the pilot surface. The shaft has an additional pilot surface on the other side of the shaft thread. Upon a mounting of the impeller to the shaft, the two pilot surfaces on the shaft engage two precision impeller hub bores which straddle the threads to provide a controlled close fit of impeller and shaft to one another and to maintain the geometric axes of impeller and shaft true with one another.

12 Claims, 2 Drawing Sheets

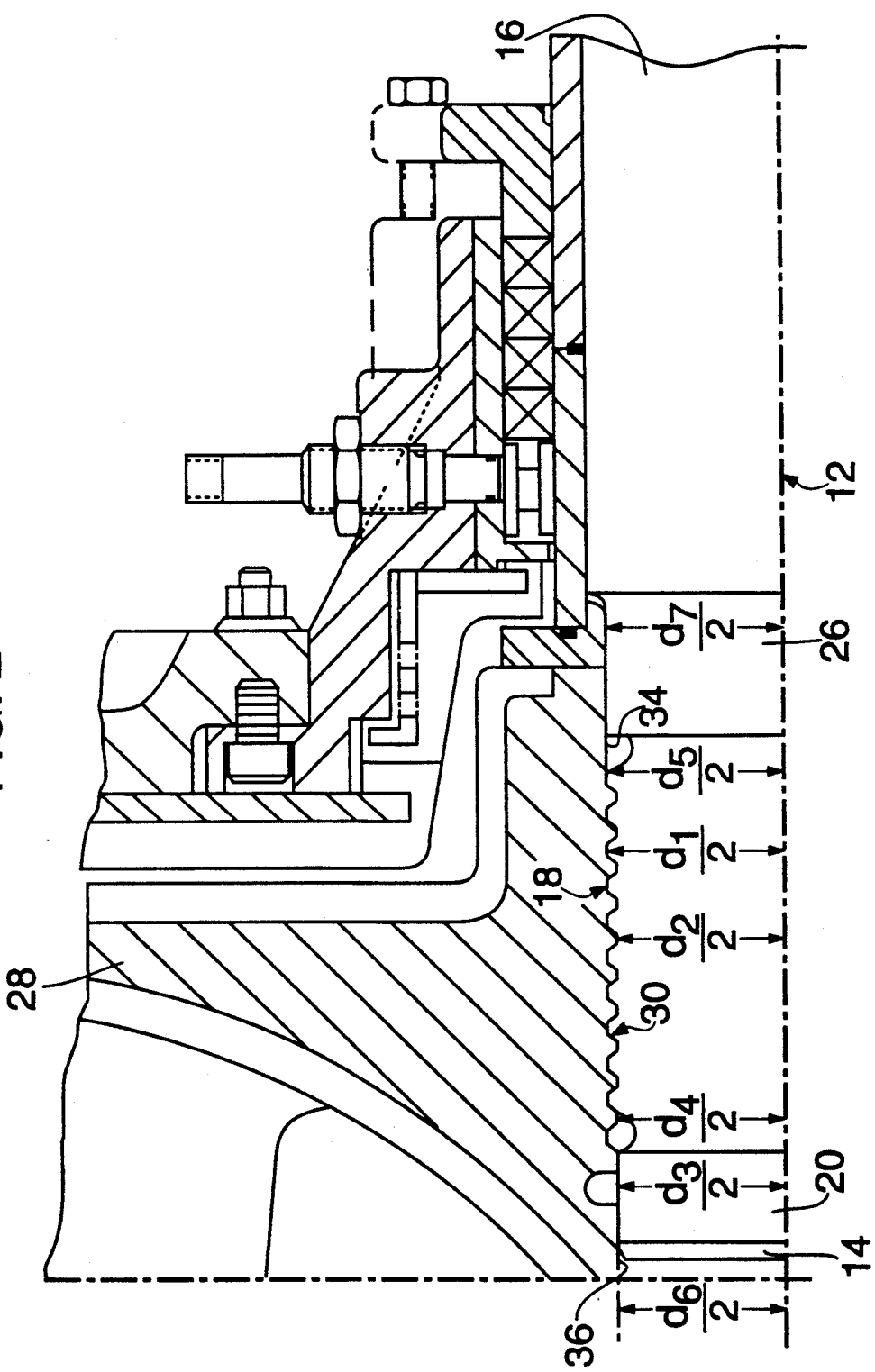

5,209,595

DRIVE SHAFT, DRIVE ASSEMBLY AND RELATED METHOD

BACKGROUND OF THE INVENTION

This invention relates to a drive shaft. This invention also relates to an assembly of a drive shaft and a driven member such as a pump impeller. In addition, this invention relates to a method for mounting a driven member such as a pump impeller to a drive shaft.

Slurry pump impellers are commonly screwed on to threaded drive shafts. With very large and heavy impellers, acme threads with loose clearances are generally used. A heavy impeller gives rise to difficulties due to alignment in engaging an internal thread on the impeller with an external thread on a drive shaft.

Furthermore, a heavy impeller with loose threads may not be aligned with the axis of rotation of the drive shaft. This misalignment adversely affects wear ring clearance and rotor balance.

SUMMARY OF THE INVENTION

A drive shaft in accordance with the present invention has a driving end and a driven end and is provided at the driving end with an external helical thread and a pilot surface disposed between the thread and the driving end.

Preferably, the pilot surface is substantially cylindrical. Where the thread on the drive shaft has an inner diameter and an outer diameter, the pilot surface has a diameter approximately equal to the inner diameter of the shaft thread.

Pursuant to another feature of the present invention, the drive shaft is provided with an additional pilot surface disposed adjacent the external thread on a side thereof opposite the driving end of the shaft. The additional pilot surface is also at least substantially cylindrical and has a diameter greater than the outer diameter of the drive shaft thread.

A drive assembly comprises, in accordance with the present invention, a drive shaft and a driven member. As discussed above, the shaft has a driving end and a driven end and is provided at the driving end with an external helical thread and a pilot surface disposed between the thread and the driving end. The driven member is attached to the shaft at the driving end and has an internal helical thread matingly engaging the external helical thread on the drive shaft. The driven member is additionally provided with an internal surface or hub bore surrounding and in contact with the pilot surface on the shaft.

Where the drive shaft is provided with an additional pilot surface disposed adjacent the external helical thread on a side thereof opposite the driving end of the shaft, the driven member has an additional internal surface or hub bore at least partially surrounding and in contact with the additional pilot surface.

The hub bores of the driven member, as well as the pilot surfaces on the drive shaft, are preferably cylindrical.

A method for mounting a driven member having an internal helical thread to a drive shaft having an external helical thread comprises, in accordance with the present invention, the steps of (a) supporting the shaft in a horizontal orientation, (b) suspending the driven member at a free end of the shaft, (c) shifting the driven member towards the shaft so that the free end is inserted into an opening in the driven member, and (d) during the step of shifting, engaging a radially inner surface of the internal helical thread with a substantially cylindrical pilot surface at the free end of the shaft, thereby aiding alignment of the opening and the driven member with the shaft. The external thread on the shaft is disposed on a side of the pilot surface opposite the free end of the shaft. Thus, upon further insertion of the drive shaft into the driven member, the internal thread in the driven member comes into contact with the external thread on the drive shaft. Upon that contact of the external helical thread with the internal helical thread, one of the driven member and the shaft is turned relative to the other so as to screw the external helical thread and the internal helical thread to one another.

Pursuant to another feature of the present invention, the assembly or mounting method further comprises the step of engaging a hub bore inside the driven member with the pilot surface during or upon a completion of the step of turning.

A supplemental step in a method in accordance with the present invention comprises the formation of contact between an additional cylindrical surface inside the driven member with another pilot surface on the shaft, that other pilot surface being disposed on a side of the external helical thread opposite the free end of the drive shaft.

A method in accordance with the present invention facilitates assembly of a driven member to a drive shaft, particularly where the driven member is heavy.

A drive assembly in accordance with the present invention enhances the alignment between a driven member and a drive shaft especially in the event that the driven member is a heavy item such as a large impeller and where mating threads on the driven member and the drive shaft are loose.

BRIEF DESCRIPTION OF THE DRAWING

FIG. 2 is a partial cross-sectional view similar to FIG. 1, showing a completed assembly of the pump impeller to the shaft.

DETAILED DESCRIPTION

Figure 1:
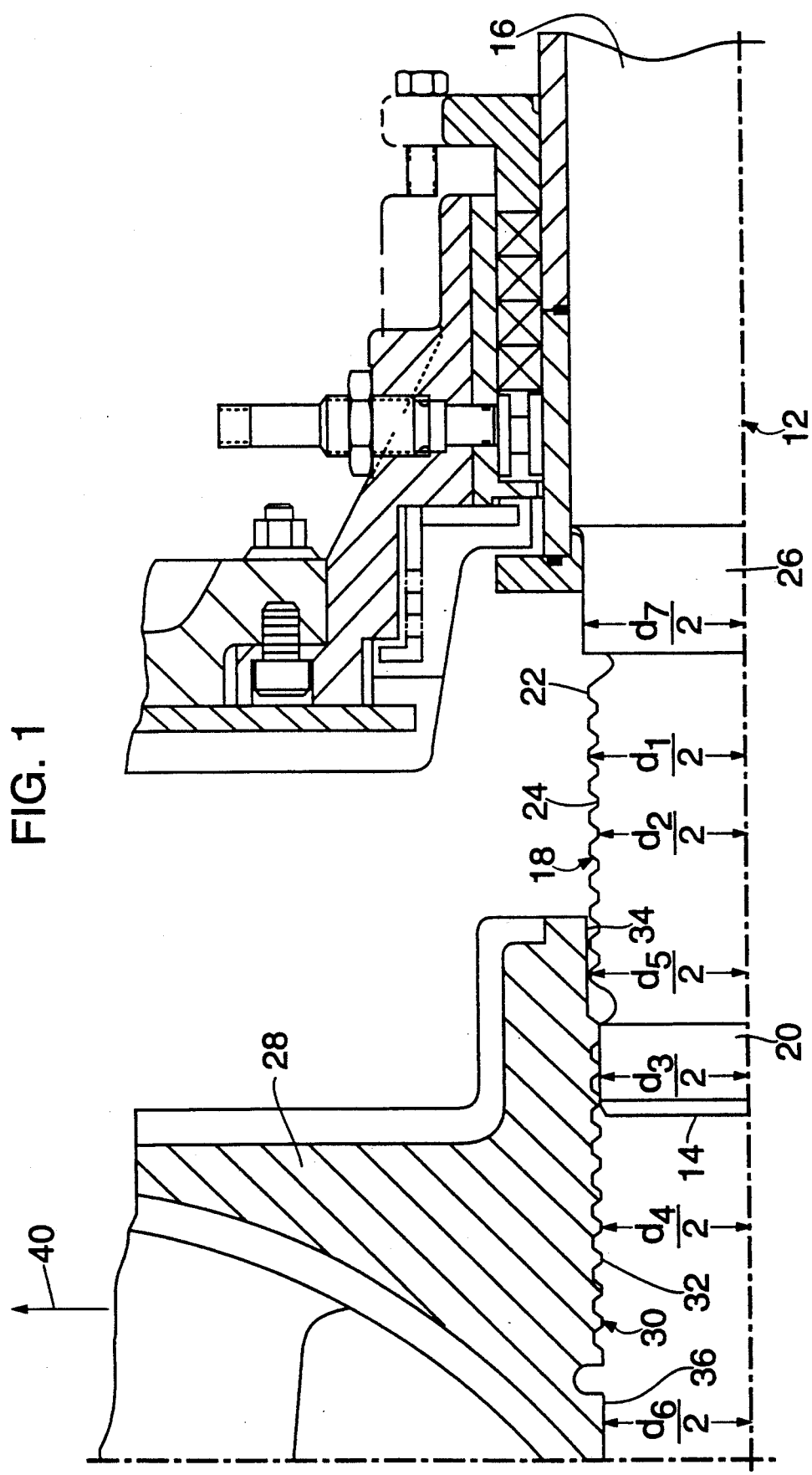
FIG. 1 is a partial cross-sectional view of a pump impeller and a drive shaft in accordance with the present invention, showing an early stage in a mounting process.

As illustrated in the drawings, a drive shaft 12 has a driving end 14 and a driven end portion 16. At driving end 14, shaft 12 is provided with an external helical thread 18 and a cylindrical pilot surface 20 disposed between the thread and the driving end.

Thread 18 has a crest flat 22 characterized by an outer thread diameter $d_1$ and a trough flat 24 characterized by an inner thread diameter $d_2$. Pilot surface 20 has a diameter $d_3$ approximately equal to inner diameter $d_2$.

Drive shaft 12 is provided with an additional cylindrical pilot surface 26 disposed adjacent thread 18 on a side thereof opposite driving end 14. Pilot surface 26 has a diameter $d_7$ greater than or at least approximately equal to outer diameter $d_1$ of thread 18.

During use, drive shaft 12 rotates a driven member 28 such as a pump impeller. Upon the assembly or mounting of impeller 28 to shaft 12, impeller 28 is attached to shaft 12 at driving end 14, as illustrated in FIG. 2.

Impeller 28 has an internal helical thread 30 with an inner surface or crest flat 32 having a diameter $d_4$ greater than inner diameter $d_2$ of thread 18 and smaller than outer diameter $d_1 1$. Threads 18 and 30 matingly engage one another upon assembly of impeller 28 to shaft 12, as shown in FIG. 2.

Impeller 28 is provided with an internal cylindrical surface or precision hub bore 34 having a diameter $d_5$ greater than outer diameter $d_1$ of thread 18, whereby bore 34 can pass around thread 18 during a mounting of impeller 28 to shaft 12, as shown in FIG. 1. Upon assembly of shaft 12 and impeller 28, bore 34 surrounds and is in contact with pilot surface 26 on the shaft 12, as depicted in FIG. 2.

Impeller 28 is additionally provided with another internal cylindrical surface or precision hub bore 36 having a diameter $d_6$ nominally greater than inner diameter $d_2$ of thread 18 and smaller than outer diameter $d_1$. Impeller 28 receives pilot surface 20 within bore 36. Upon assembly of shaft 12 and impeller 28, bore 36 surrounds and is in contact with pilot surface 20.

In mounting impeller 28 to drive shaft 12, shaft 12 is supported in a horizontal orientation by a bearing assembly (not shown), while impeller 28 is suspended via an overhead strap, indicated schematically by arrow 40, at the free end of shaft 12, i.e., at driving end 14. Impeller 28 is shifted or pushed axially towards shaft 12 so that driving end 14 is inserted into an opening in the impeller 28 defined by hub bore 34. During the pushing of impeller 28 towards shaft thread 1B, inner surface or crest flat 32 of impeller thread 30 slides along pilot surface 20. A portion of the weight of impeller 28 may be born on pilot surface 20. However, most of the weight is carried by the overhead strap.

Upon contact between impeller thread 30 and shaft thread 18 during the insertion of shaft 12 into impeller 28, shaft 12 is turned relative to impeller 28 so as to screw thread 18 and thread 30 to one another. Of course, shaft 12 may be turning prior to engagement of threads 18 and 30 and prior to the engagement of crest flat 32 with pilot surface 20.

Pilot surface 20 aids alignment of impeller 28 with shaft 12 during the assembly operation. In addition, upon assembly of impeller 28 and shaft 12, pilot surface 20 in cooperation with hub bore 36 at one end of threads 18 and 30 and pilot surface 26 in cooperation with hub bore 34 at the other end of threads 18 and 30 serve to provide a controlled close fit of impeller 28 and shaft 12 to one another and to maintain the geometric axes of impeller 28 and shaft 12 true with one another.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A drive assembly comprising:
   a drive shaft having a driving end and a driven end, said shaft being provided at said driving end with said thread and said driving end, said thread having a flat crest and a flat trough; and
   a driven member attached to said shaft at said driving end, said driven member having an internal helical thread matingly engaging said external helical thread, said driven member being provided with an internal surface at least partially surrounding and in contact with said pilot surface, said external helical thread having a flat crest and a flat trough.

2. The assembly defined in claim 1 wherein said pilot surface is substantially cylindrical.

3. The assembly defined in claim 2 wherein said external helical thread has an inner diameter and an outer diameter, said pilot surface having a diameter approximately equal to said inner diameter.

4. The assembly defined in claim 3 wherein said drive shaft is provided with an additional pilot surface disposed adjacent said external helical thread on a side thereof opposite said driving end, said driven member having an additional internal surface at least partially surrounding and in contact with said additional pilot surface.

5. The assembly defined in claim 4 wherein said additional pilot surface is cylindrical.

6. The assembly defined in claim 5 wherein said additional pilot surface has a diameter greater than said outer diameter.

7. The assembly defined in claim 1 wherein said drive shaft is provided with an additional pilot surface disposed adjacent said external helical thread on a side thereof opposite said driving end, said driven member having an additional internal surface surrounding and in contact with said additional pilot surface.

8. The assembly defined in claim 1 wherein said driven member is a pump impeller.

9. A method for mounting a driven member having an internal helical thread to a drive shaft having an external helical thread, comprising the steps of:
   supporting said shaft in a horizontal orientation;
   suspending said driven member at a free end of said shaft;
   shifting said driven member towards said shaft so that said free end is inserted into an opening in said driven member;
   during said step of shifting, engaging a flat of said internal helical thread with a substantially cylindrical pilot surface at said free end of said shaft, thereby aiding alignment of said opening and said driven member with said shaft, the external thread on said shaft being disposed on a side of said pilot surface opposite said free end;
   upon contact, during said step of shifting, of said external helical thread with said internal helical thread, turning one of said driven member and said shaft relative to the other of said shaft and said driven member to screw said external helical thread and said internal helical thread to one another; and
   partially resting said flat on said pilot surface during said step of turning so as to partially support weight of said driven member.

10. The method defined in claim 9 further comprising the step of engaging a cylindrical surface inside said driven member with said pilot surface upon a completion of said step of turning.

11. The method defined in claim 10, further comprising the step of forming contact between an additional cylindrical surface inside said driven member with another pilot surface on said shaft, said another pilot surface being disposed on a side of said external helical thread opposite said free end.

12. The method defined in claim 9 wherein said driven member is a pump impeller.

* * * * *

UNITED STATES PATENT AND TRADEMARK OFFICE
CERTIFICATE OF CORRECTION

PATENT NO. : 5,209,595

DATED : May 11, 1993

INVENTOR(S) : John Hyll

It is certified that error appears in the above-identified patent and that said Letters Patent is hereby corrected as shown below:

```
Column 3, line 1, change "d₁1" to --d₁--;
line 27, change "1B" to --18--.
 Column 3,
Claim 1, line 3, after "with" insert --an
external helical thread and a pilot surface
disposed between--.
```

Signed and Sealed this

Eleventh Day of January, 1994

Attest:

BRUCE LEHMAN

Attesting Officer    Commissioner of Patents and Trademarks